(12) United States Patent
Kon et al.

(10) Patent No.: US 9,915,795 B2
(45) Date of Patent: Mar. 13, 2018

(54) LIGHT RECEPTACLE AND LIGHT MODULE

(71) Applicant: Enplas Corporation, Saitama (JP)

(72) Inventors: Ayano Kon, Saitama (JP); Shimpei Morioka, Saitama (JP); Sanshilo Nagai, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/025,924

(22) PCT Filed: Sep. 10, 2014

(86) PCT No.: PCT/JP2014/073882
§ 371 (c)(1),
(2) Date: Mar. 30, 2016

(87) PCT Pub. No.: WO2015/045863
PCT Pub. Date: Apr. 2, 2015

(65) Prior Publication Data
US 2016/0238802 A1    Aug. 18, 2016

(30) Foreign Application Priority Data
Sep. 30, 2013    (JP) .................................. 2013-203666

(51) Int. Cl.
G02B 6/26    (2006.01)
G02B 6/42    (2006.01)

(52) U.S. Cl.
CPC ......... *G02B 6/4214* (2013.01); *G02B 6/4239* (2013.01); *G02B 6/4244* (2013.01); *G02B 6/4249* (2013.01); *G02B 6/4292* (2013.01)

(58) Field of Classification Search
CPC .................................................. G02B 6/4239
See application file for complete search history.

(56) References Cited

U.S. PATENT DOCUMENTS 4,702,556 A  * 10/1987 Ishii ..................... G02B 6/4202
                                                          385/91
7,891,885 B2 *  2/2011 Ariga .................. H01S 5/02208
                                                          372/108
(Continued)

FOREIGN PATENT DOCUMENTS

JP    H09-226167 A    9/1997
JP    2002-314182 A   10/2002
(Continued)

OTHER PUBLICATIONS

International Search Report from International Application No. PCT/JP2014/073882 dated Nov. 18, 2014.

*Primary Examiner* — Chris Chu
(74) *Attorney, Agent, or Firm* — Brundidge & Stranger, P.C.

(57)    ABSTRACT

The light receptacle has: a light transmitting light receptacle main body (130); support parts (140) disposed on both ends of the light receptacle main body (130); first optical surfaces (132) to which light emitted by light-emitting elements (114) is made incident; second optical surfaces (136) that output light made incident at the plurality of first optical surfaces (132) toward the end surfaces of a plurality of light transmitting bodies (116); and four adhesive holding parts (142) that are through holes or recesses with the entire periphery thereof surrounded by the support parts and that are disposed at the four corners of the light receptacle (120) in a plane view. The light receptacle main body (130) and the support parts (140) have a plane-symmetrical shape, and the four adhesive holding parts (142) are disposed in plane-symmetrical positions.

6 Claims, 11 Drawing Sheets

(56) References Cited

U.S. PATENT DOCUMENTS

| | | | |
|---|---|---|---|
| 2002/0159707 A1* | 10/2002 | Mortzheim | G02B 6/4231 385/52 |
| 2004/0234210 A1* | 11/2004 | Nagasaka | G02B 6/4214 385/88 |
| 2012/0141065 A1 | 6/2012 | Oguri et al. | |
| 2013/0148931 A1* | 6/2013 | Nekado | G02B 6/4201 385/92 |
| 2013/0266260 A1 | 10/2013 | Morioka et al. | |
| 2015/0010273 A1 | 1/2015 | Oyagi et al. | |
| 2015/0036985 A1 | 2/2015 | Shibuya et al. | |

FOREIGN PATENT DOCUMENTS

| | | |
|---|---|---|
| JP | 2010-175942 A | 8/2010 |
| JP | 2011-197633 A | 10/2011 |
| JP | 2012-108443 A | 6/2012 |
| JP | 2013-164497 A | 8/2013 |
| WO | 2013/125283 A1 | 8/2013 |

\* cited by examiner

LIGHT RECEPTACLE AND LIGHT MODULE

TECHNICAL FIELD

The present invention relates to an optical receptacle and an optical module including the same.

BACKGROUND ART

In optical communications using optical transmission members such as optical fibers and light waveguides, optical modules have been used, provided with a light emitting element such as a surface-emitting laser (for example, VCSEL: Vertical Cavity Surface Emitting Laser). Such an optical module includes an optical receptacle that allows light including communication information emitted from a light emitting element to be incident on the end surface of an optical transmission member.

For example, PTL 1 discloses an optical module including an optical connector and a substrate with light emitting elements disposed thereon. The optical connector includes optical fibers and a connector part including a lens array (optical receptacle) disposed between the tips of the plurality of the optical fibers and the light emitting elements. The lens array includes a reflecting mirror that reflects light emitted from the light emitting elements toward the optical fiber tips, and a condenser lens that concentrates the light reflected by the reflecting mirror toward the optical fiber tips.

In the optical module disclosed in PTL 1, the optical connector is fixed to the substrate by positioning the optical connector at a certain position in the substrate, putting a thermosetting epoxy resin adhesive on the boundary between the lens array edges and the substrate, and heat curing the adhesive.

In an optical module produced in such a manner, light emitted from a light emitting element is reflected by a reflecting mirror toward an optical fiber tip, and reaches the optical fiber tip via a condenser lens.

CITATION LIST

Patent Literature

PTL 1
Japanese Patent Application Laid-Open No. 2010-175942

SUMMARY OF INVENTION

Technical Problem

However, when the epoxy resin adhesive is cured in the optical module disclosed in PTL 1, the lens array (condenser lens and reflecting mirror) is deformed as if the lens array is pulled toward the epoxy resin adhesive side (i.e., laterally) by the shrinkage of the epoxy resin adhesive. The epoxy resin adhesive is cured with the lens array in the deformed state. The lens array is thus kept in the deformed state after fixed to the substrate, which may lead to light emitted from the light emitting element not properly guided to the end surface of the optical fiber. As described above, the lens array (optical receptacle) disclosed in PTL 1 is disadvantageously deformed when fixed with an adhesive.

An object of the present invention is to provide an optical receptacle that is not easily deformed even when the optical receptacle is fixed using an adhesive. Another object of the present invention is to provide an optical module including the optical receptacle.

Solution to Problem

An optical receptacle according to the present invention is disposed between a plurality of light emitting elements or a plurality of light receiving elements and a plurality of optical transmission members, and is configured to optically couple the light emitting elements or the light receiving elements to end surfaces of the optical transmission members, an optical receptacle body including a plurality of first optical surfaces and a plurality of second optical surfaces, each of the first optical surfaces being configured such that light emitted from a corresponding one of the light emitting elements is incident on the first optical surface or being configured to emit light propagating inside the optical receptacle body toward a corresponding one of the light receiving elements, and each of the second optical surfaces being configured to emit the light incident on the first optical surface toward an end surface of a corresponding one of the optical transmission members or being configured such that light from a corresponding one of the optical transmission members is incident on the second optical surface; supporters which are connected to both ends of the optical receptacle body, respectively; and four adhesive reservoirs which are disposed at respective four corners of the optical receptacle in plan view, wherein each of the adhesive reservoirs is a through hole or a recess, and entire circumference of the through hole or the recess is surrounded by the supporter, wherein the optical receptacle body and the supporters together have a plane symmetrical shape with respect to a plane parallel to an optical axis of the light emitted from each of the second optical surfaces, and the four adhesive reservoirs are disposed plane symmetrically with respect to the plane.

An optical module according to the present invention includes: the optical receptacle of the present invention, and a substrate on which light emitting elements or light receiving elements are disposed, wherein the optical receptacle is fixed to a surface of the substrate with an adhesive injected into the four adhesive reservoirs.

Advantageous Effects of Invention

According to the present invention, a plurality of light emitting elements or a plurality of light receiving elements can be optically coupled suitably to a plurality of optical transmission members even when an optical receptacle is fixed using an adhesive.

DESCRIPTION OF EMBODIMENTS

Hereinafter, embodiments of the present invention will be described in detail with reference to the accompanying drawings.

Embodiment 1

(Configuration of Optical Module)

Figure 1:
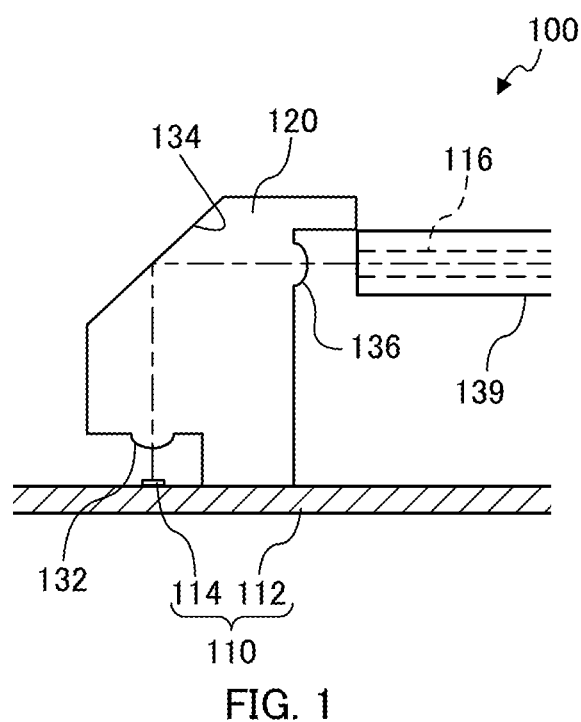
FIG. 1 is a cross-sectional view of an optical module according to Embodiment 1.

FIG. 1 is a cross-sectional view of optical module 100 according to Embodiment 1 of the present invention. Hatching is omitted in the cross-section of optical receptacle 120 in FIG. 1 to show an optical path in optical receptacle 120.

As shown in FIG. 1, optical module 100 includes substrate-mounted photoelectric conversion device 110 including light emitting elements 114, and optical receptacle 120. Optical module 100 is used with optical receptacle 120 connected to optical transmission members 116. Optical transmission member 116 may be a single-mode optical fiber or a multi-mode optical fiber. Optical transmission member 116 may be a light waveguide.

Photoelectric conversion device 110 includes substrate 112 and a plurality of light emitting elements 114. Light emitting elements 114 are disposed in line on substrate 112, and configured to emit laser light in the direction perpendicular to the surface of substrate 112. Light emitting element 114 is, e.g., Vertical Cavity Surface Emitting Laser (VCSEL).

Optical receptacle 120 optically couples light emitting elements 114 to the end surfaces of optical transmission members 116, in the state of being disposed between photoelectric conversion device 110 and optical transmission members 116. A configuration of optical receptacle 120 is described in detail below.

(Configuration of Optical Receptacle)

FIGS. 2A to 2E illustrate a configuration of optical receptacle 120 according to Embodiment 1. FIGS. 2A to 2E are a plan view, a bottom view, a front view, a back view and a right side view of the optical receptacle, respectively.

Figure 2A:
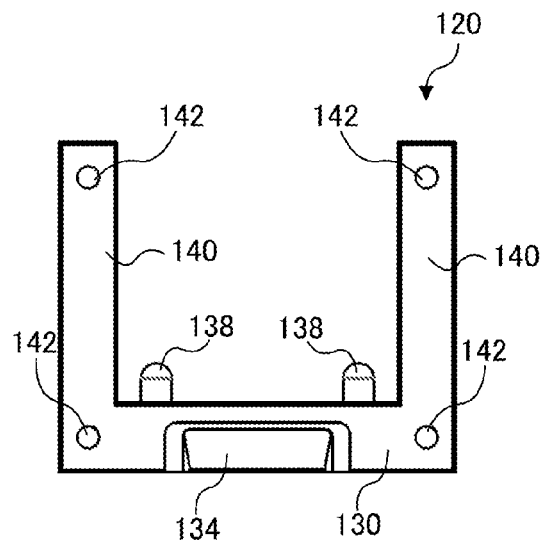
FIGS. 2A to 2E illustrate a configuration of an optical receptacle according to Embodiment 1.
Figure 2C:
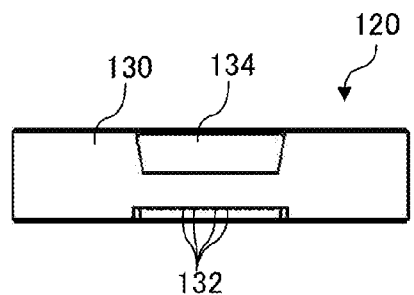
Figure 2D:
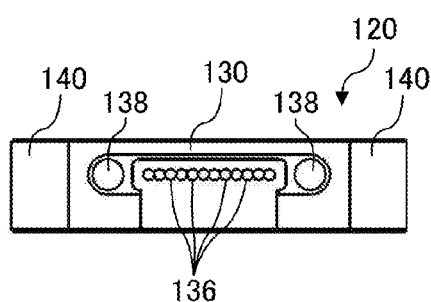

As shown in FIG. 2A, optical receptacle 120 is a squarely U-shaped member in plan view. Optical receptacle 120 includes optical receptacle body 130 and two supporters 140. Optical receptacle body 130 and supporters 140 together have a plane symmetrical shape with respect to a plane parallel to the optical axis of light emitted from each of second optical surfaces 136.

Optical receptacle body 130 is light transmissive and configured to emit light emitted from light emitting element 114 toward the end surface of optical transmission member 116. The shape of optical receptacle body 130 is substantially rectangular parallelepiped. Optical receptacle body 130 includes a plurality of first optical surfaces (incidence surfaces) 132, third optical surface (reflection surface) 134, a plurality of second optical surfaces (emission surfaces) 136 and two projections 138. Optical receptacle body 130 is formed of a material transmitting light with a wavelength used for optical communications. Examples of the materials include transparent resins such as polyetherimide (PEI) and cyclic olefin resins. Optical receptacle body 130 can be made by injection molding.

First optical surface 132 is an incidence surface that refracts laser light emitted from light emitting element 114 to allow the light to enter inside optical receptacle body 130. The plurality of first optical surfaces 132 are disposed in line on the bottom surface side of optical receptacle body 130 so as to face respective light emitting elements 114. First optical surface 132 may be in any shape. In the present embodiment, the shape of first optical surface 132 is that of a convex lens protruding toward light emitting element 114. The shape of first optical surface 132 in plan view is a circle. The central axis of first optical surface 132 is preferably perpendicular to the light emitting surface of light emitting element 114 (and to the surface of substrate 112). Further, the central axis of first optical surface 132 preferably coincides with the optical axis of the laser light emitted from light emitting element 114. The light incident on first optical surface 132 (incidence surface) propagates toward third optical surface 134 (reflection surface).

Third optical surface 134 is a reflection surface that reflects the light incident on first optical surface 132 toward second optical surface 136. Third optical surface 134 is tilted such that the distance from optical transmission member 116 decreases in the direction from the bottom surface to the top surface of optical receptacle body 130. The inclination angle of third optical surface 134 relative to the optical axis of light emitted from light emitting element 114 is not particularly limited. In the present embodiment, the inclination angle of third optical surface 134 is 45° relative to the optical axis of light incident on first optical surface 132. Third optical surface 134 may be in any shape. In the present embodiment, the shape of third optical surface is a flat surface. The light incident on first optical surface 132 is incident on third optical surface 134 at an incident angle larger than the critical angle. Third optical surface 134 totally reflects the incident light toward second optical surface 136. That is, light with a predetermined light flux diameter is incident on third optical surface 134 (reflection surface) and the light with the predetermined light flux diameter is emitted toward second optical surface 136 (emission surface) from third optical surface 134.

Second optical surface 136 is an emission surface that emits the light totally reflected by third optical surface 134 toward the end surface of optical transmission member 116. The plurality of second optical surfaces are disposed in line on a first side surface of optical receptacle body 130 so as to face respective end surfaces of optical transmission members 116. Second optical surface 136 may be in any shape. In the present embodiment, the shape of second optical surface 136 is that of a convex lens protruding toward the end surface of optical transmission member 116. This enables the light having the predetermined light flux diameter reflected by third optical surface 134 to be efficiently coupled to the end surface of optical transmission member 116. The central axis of second optical surface 136 preferably coincides with the central axis of the end surface of optical transmission member 116.

Two projections 138 are disposed on the first side surface where second optical surfaces 136 are disposed in optical receptacle body 130. Optical transmission members 116 can be fixed to optical receptacle body 130 by respectively engaging two projections of optical receptacle body 130 with two recesses in optical transmission member attachment 139 (see FIG. 1) fixed to the end part of optical transmission members 116.

Supporters 140 are parts for fixing optical receptacle body 130 to substrate 112. Each of the two supporter 140 has two adhesive reservoirs 142. This means that optical receptacle 120 has four adhesive reservoirs 142. Each of supporters 140 is substantially rectangular parallelepiped, and supporters 140 are connected to the both ends of optical receptacle body 130, respectively. Supporter 140 is connected to optical receptacle body 130 at one end part of supporter 140. Supporter 140 is disposed in a direction the same as that of light emitted from second optical surface 136. Supporter 140 may be formed of the same light transmissive material as optical receptacle body 130, or of a different non-light transmissive material. For example, supporters 140 can be integrally made of the same material as optical receptacle 120 by injection molding.

Figure 2B:
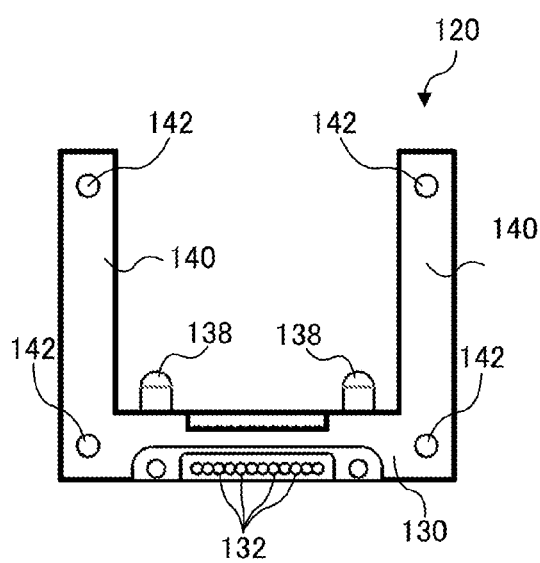
Figure 2E:
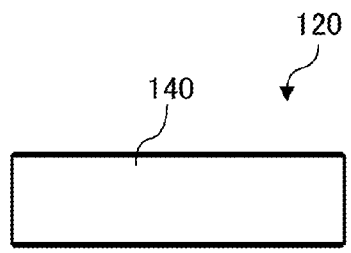
Figure 3:
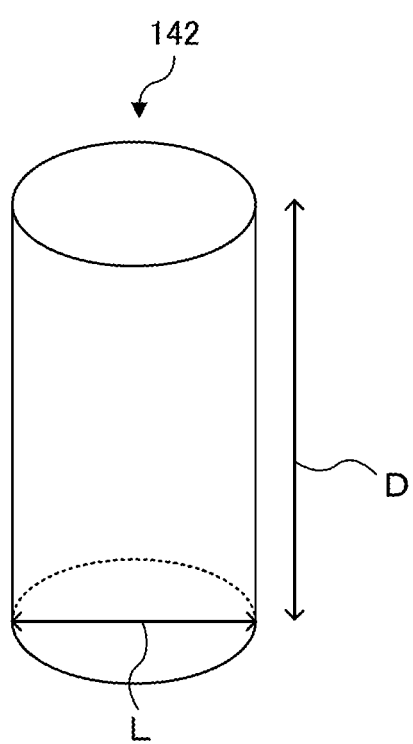
FIG. 3 is a schematic view of an adhesive reservoir.

Adhesive reservoir 142 is filled with an adhesive in order to be mounted (fixed) on substrate 112. As shown in FIGS. 2A and 2B, adhesive reservoirs 142 are disposed at respective four corners of optical receptacle 120 in plan view. Further, four adhesive reservoirs 142 are disposed plane symmetrically with respect to the plane parallel to the optical axis of light emitted from each of second optical surfaces 136. Four adhesive reservoirs 142 are disposed at the both end parts of supporters 140, respectively. Adhesive reservoir 142 may be in any shape. In the present embodiment, adhesive reservoir 142 is a cylindrical through hole. That is, adhesive reservoir 142 has circular openings on the top and bottom, and except that, adhesive reservoir 142 is surrounded by supporter 140 from every direction (throughout entire circumference). The opening of adhesive reservoir 142 may have any size. The size of the opening of adhesive reservoir 142 can be appropriately set depending on the material or size of supporter 140 or the nature of the adhesive to be used. FIG. 3 is a schematic view of adhesive reservoir 142. As shown in FIG. 3, the area of the inner peripheral surface of the through hole is $\pi LD$ (about 3.14LD) when the diameter of the opening is L and the height of the through hole is D. Examples of the adhesives for injection into adhesive reservoir 142 include known thermosetting epoxy resin adhesives and ultraviolet curable resin adhesives.

Optical receptacle 120 is fixed to substrate 112 by positioning optical receptacle 120 on substrate 112, then injecting an adhesive into adhesive reservoirs 142, and curing the adhesive.

Specifically, optical receptacle 120 is positioned on substrate 112 such that the central axis of each of first optical surfaces 132 coincides with the optical axis of laser light emitted from corresponding light emitting element 114. Then, an adhesive is injected into each of adhesive reservoirs 142 so that the adhesive is brought in contact with the entire circumference of the inner peripheral surface of adhesive reservoir 142, and subsequently the adhesive is cured. When a thermosetting epoxy resin adhesive is used, for example, the adhesive is heated. These steps enable optical receptacle 120 to be fixed to substrate 112.

Figure 4A:
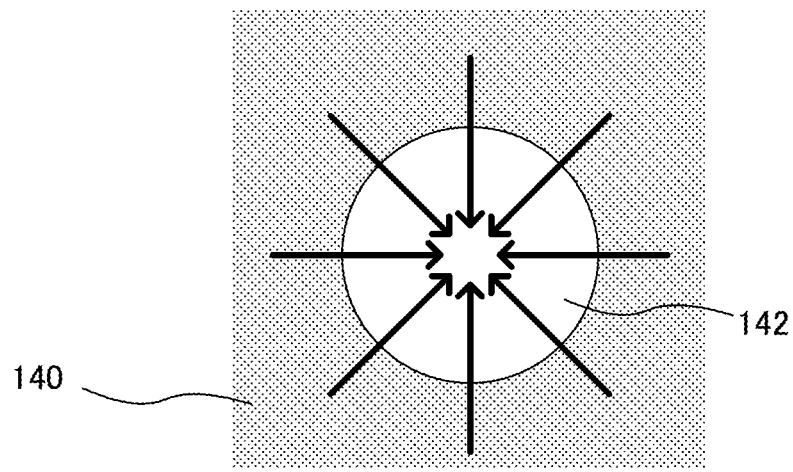
FIGS. 4A and 4B illustrate deforming directions of an optical receptacle (supporter) at the time of curing an adhesive.
Figure 4B:
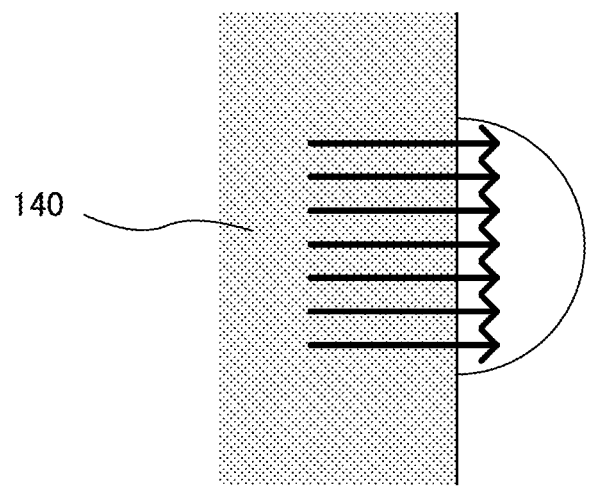

FIGS. 4A and 4B illustrate deforming directions of optical receptacle 120 (supporter 140) at the time of curing the adhesive. FIG. 4A is a schematic view illustrating deforming directions of optical receptacle 120 in an optical module according to Embodiment 1. FIG. 4B is a schematic view illustrating deforming directions of the optical receptacle when the adhesive is put on the outside of the optical receptacle for comparison. As shown in FIG. 4A, a part of supporter 140 which is in contact with the adhesive (inner peripheral surface of adhesive reservoir 142) is pulled toward the center of adhesive reservoir 142 by the shrinkage of the adhesive. In the present embodiment, the adhesive is in contact with the inner peripheral surface of adhesive reservoir 142 throughout the entire circumference of the surface. Thus, horizontal forces derived from the adhesive shrinkage, which cause deformation of optical receptacle 120 (supporter 140), are offset by each other. By virtue of four adhesive reservoirs 142 being disposed plane symmetrically with respect to the plane in plan view, the deformation of optical receptacle 120 by the shrinkage of the adhesive can be further reduced. Therefore, the deformation of optical receptacle body 130 can be reduced even when optical receptacle body 130 is fixed using an adhesive. On the other hand, as shown in FIG. 4B, supporter 140 is deformed as if it is pulled outward when the optical receptacle is fixed with an adhesive put on the outside of the optical receptacle.

Figure 5A:
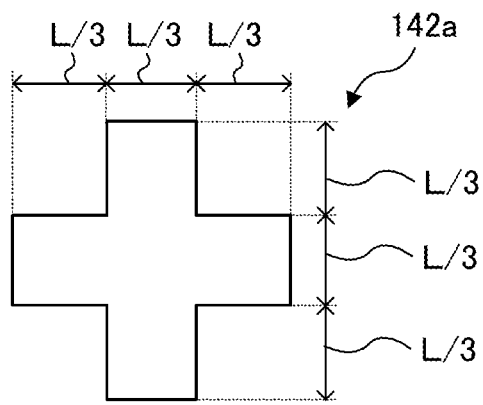
FIGS. 5A to 5C illustrate openings of adhesive reservoirs each having a different shape.
Figure 5B:
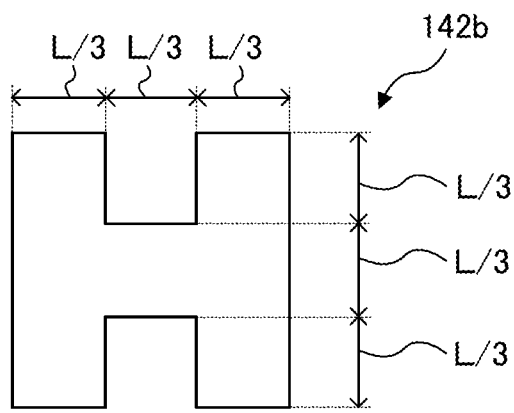
Figure 5C:
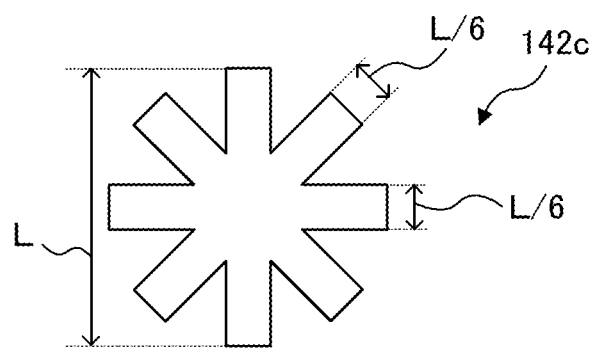
Figure 6A:
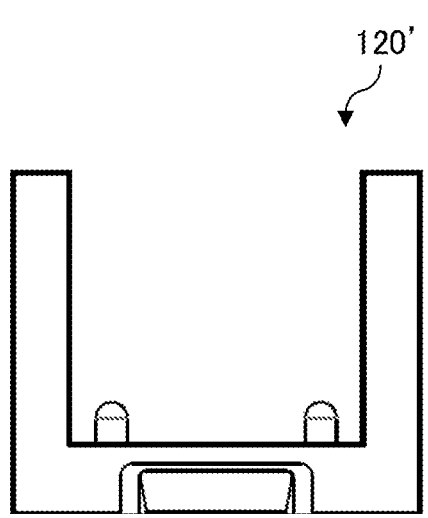
FIGS. 6A to 6E illustrate a configuration of an optical receptacle of Comparative Example.
Figure 6B:
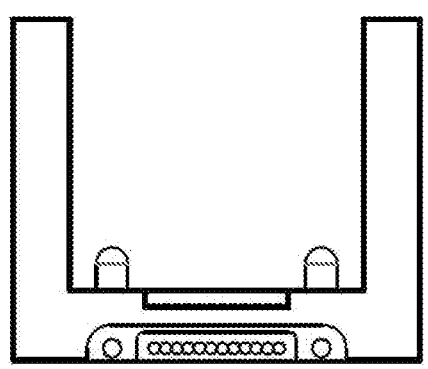
Figure 6C:
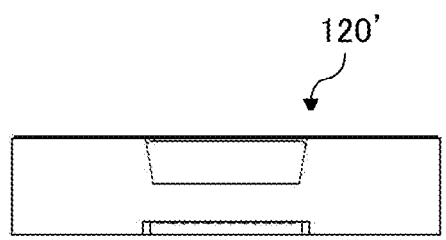
Figure 6D:
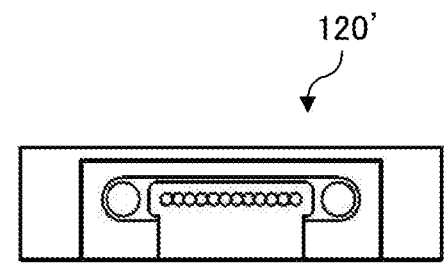
Figure 6E:
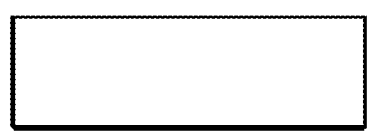

FIGS. 5A to 5C illustrate openings of adhesive reservoirs each having another shape. As shown in FIG. 5A, the shape of an opening of adhesive reservoir 142a may be a cross-shape. In this case, the area of the inner peripheral surface of the through hole is 4LD when the maximum dimension of the through hole is L, the line width of the cross is L/3, and the height of the through hole is D. As shown in FIG. 5B, the shape of an opening of adhesive reservoir 142b may be an H-shape. In this case, the area of the inner peripheral surface of the through hole is about 5LD (16/3LD) when the line width of H is L/3. Further, as shown in FIG. 5C, the shape of an opening of adhesive reservoir 142c may be a shape of a cross and another cross rotated by 45° to superimpose on the former cross. In this case, the area of the inner peripheral surface of the through hole is about 6LD (6.1LD) when the line width of the cross is L/6. Optical receptacles respectively having adhesive reservoirs 142a, 142b and 142c shown in FIGS. 5A to 5C can be manufactured by the same steps used for manufacturing the optical receptacle according to Embodiment 1.

(Simulation)

The moving distances of first optical surfaces 132 (deformation amount of optical receptacle) were simulated for each of four optical receptacles having an different shaped opening of adhesive reservoir 142 when the optical receptacle was fixed with a thermosetting epoxy resin adhesive (after heating). The moving distances of each of first optical surfaces 132 in planer directions (X axis direction and Y axis direction) by heating were analyzed by a finite element method. For comparison, optical receptacle 120' having supporters without adhesive reservoir 142 was also simulated. Parameters set for the simulation are shown in Table 1. The curing temperature and curing time of the thermosetting epoxy resin adhesive were set 100° C. and 1 hour, respectively, in the simulation. Since each of the optical receptacles has a plane symmetrical shape with respect to a plane, only the right half of the optical receptacle was simulated. Incidence surfaces 132 were numbered 1 to 12 with the incidence surface at the right most side as number one. Therefore, the moving distances of first optical surfaces 132 with numbers 7 to 12 were simulated.

TABLE 1

| | Optical Receptacle | Adhesive | Substrate |
|---|---|---|---|
| Material | Polyetherimide | Thermosetting epoxy resin adhesive | Glass epoxy |
| Young's modulus (GPa) | 3.4 | 8.8 | 24.6 |
| Poisson's ratio | 0.4 | 0.3 | 0.2 |
| Linear expansion coefficient (/° C.) | $5.6 \times 10^{-5}$ | $4.0 \times 10^{-5}$ | $1.1 \times 10^{-5}$ |

FIGS. 6A to 6E illustrate a configuration of optical receptacle 120' of Comparative Example without adhesive reservoir 142. FIGS. 6A to 6E are a plan view, a bottom view, a front view, a back view and a right side view of the optical receptacle of Comparative Example, respectively.

Figure 7A:
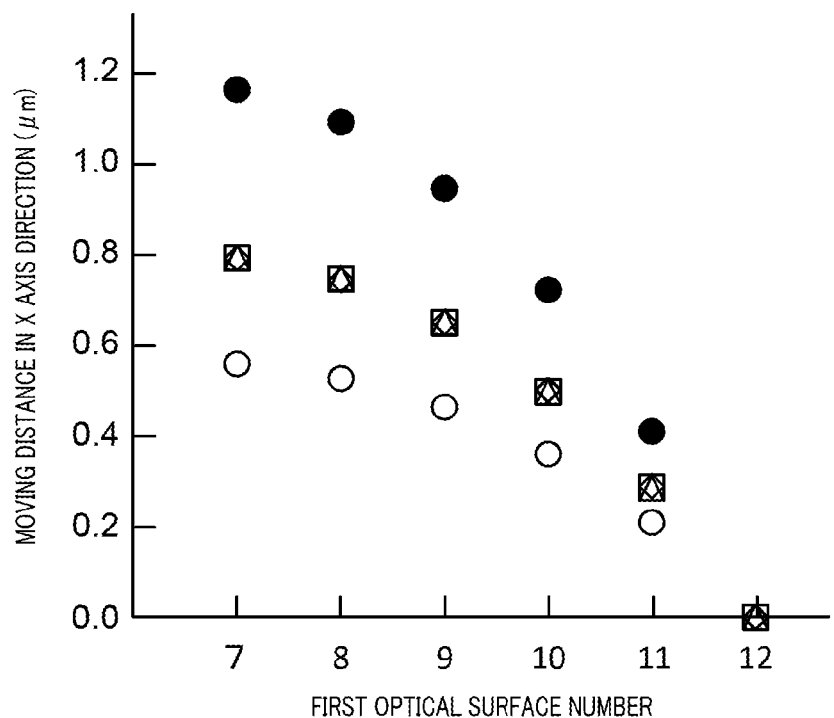
FIGS. 7A and 7B are simulation results for the optical receptacle according to Embodiment 1.
Figure 7B:
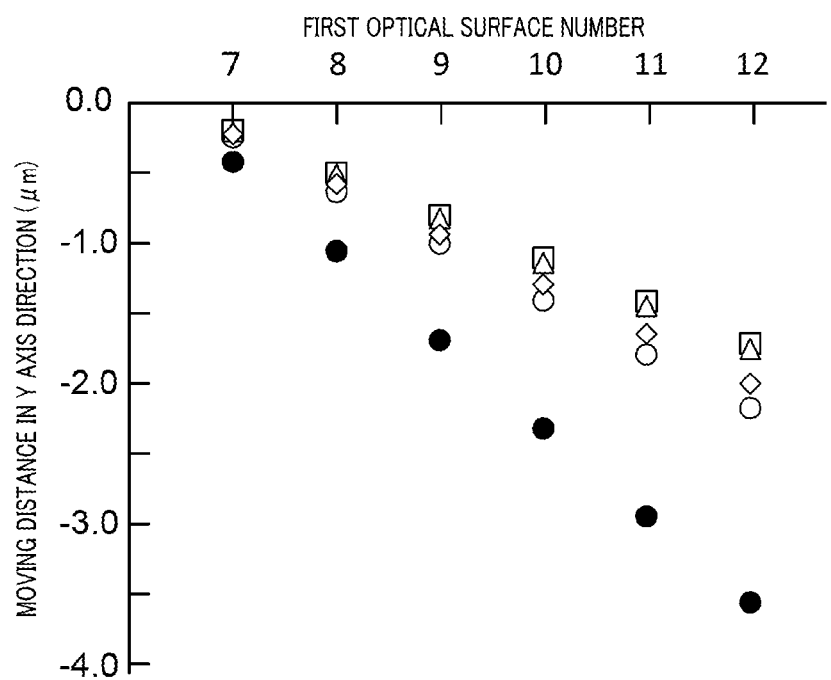
Figure 8A:
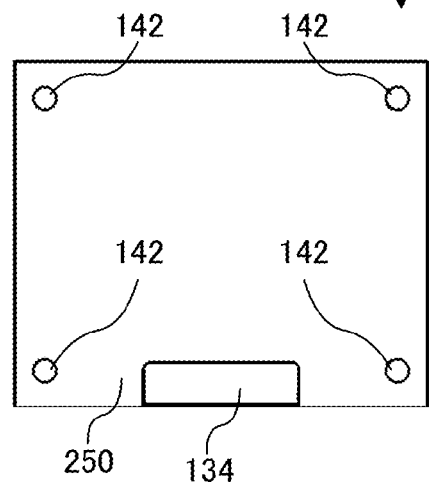
FIGS. 8A to 8E illustrate a configuration of an optical receptacle according to a modification of Embodiment 1.
Figure 8B:
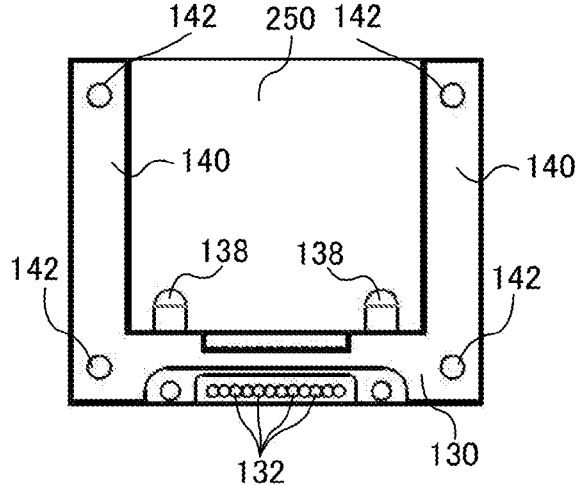
Figure 8C:
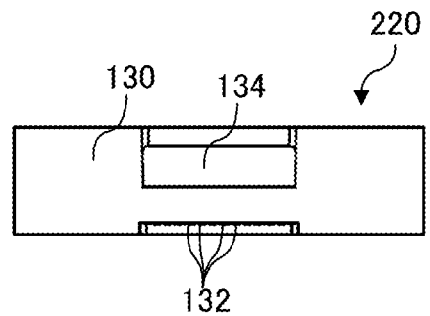
Figure 8D:
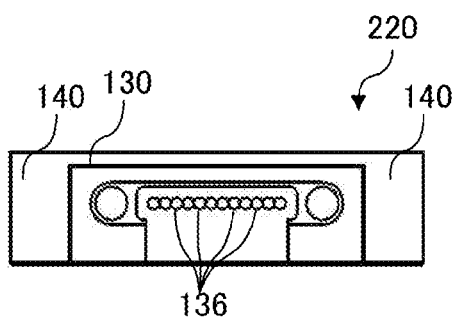
Figure 8E:
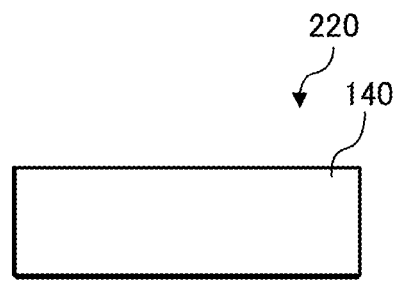
Figure 9A:
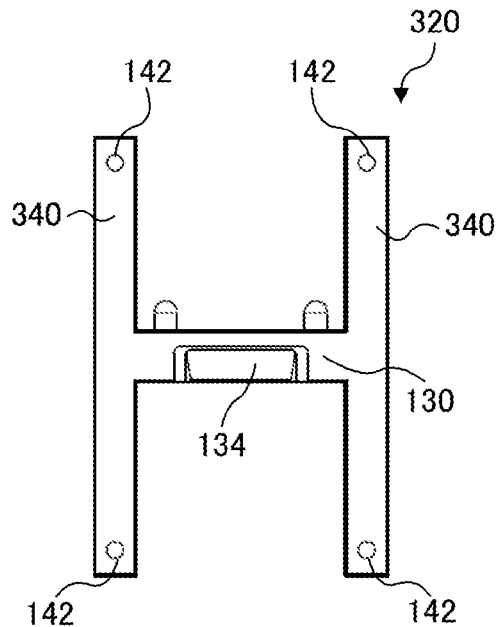
FIGS. 9A to 9E illustrate a configuration of an optical receptacle according to Embodiment 2.
Figure 9B:
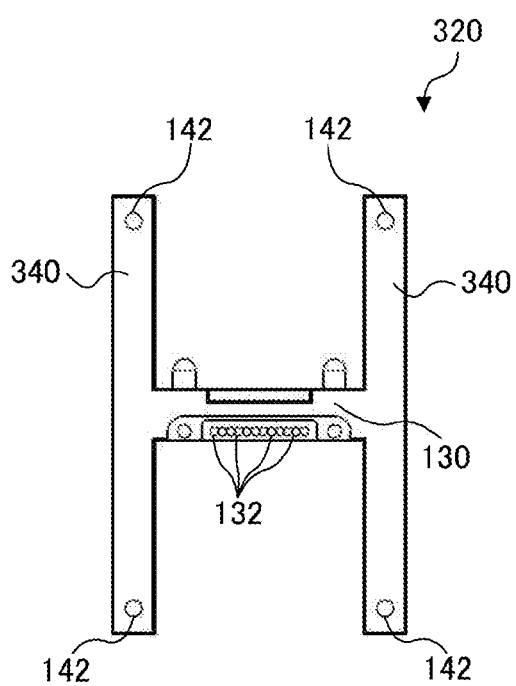
Figure 9C:
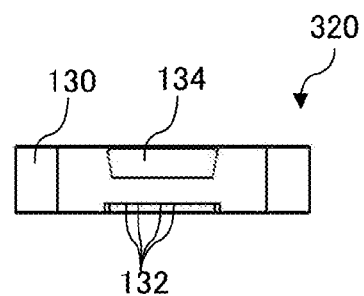
Figure 9D:
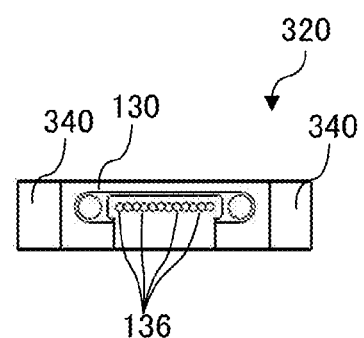
Figure 9E:
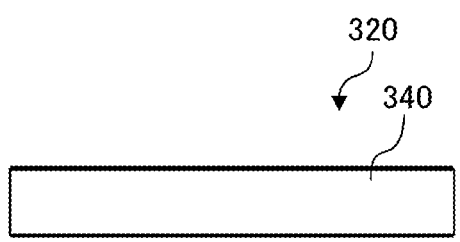

FIGS. 7A and 7B are graphs showing the relationship between first optical surfaces (incidence surfaces) and the respective moving distances of first optical surfaces caused by the curing of the adhesive. FIG. 7A is a graph showing the moving distances of first optical surfaces 132 in X axis direction, and FIG. 7B is a graph showing the moving distances of first optical surfaces 132 in Y axis direction. As used herein, "X axis direction" refers to the direction along the central axis of the second optical surface (vertical direction in FIG. 2B), and "Y axis direction" refers to the array direction of the first optical surfaces (horizontal direction in FIG. 2B). In the graphs, the abscissa represents the numbers of the first optical surfaces given as described above. The ordinate represents the moving distance of the first optical surface from a position before curing the adhesive to a position after curing the adhesive. Black circle symbols show simulation results for optical receptacle 120' of Comparative Example in FIGS. 6A to 6E, white circle symbols show simulation results for optical receptacle 120 having adhesive reservoirs 142 with the shape shown in FIG. 3, white square symbols show simulation results for optical receptacle 120 having adhesive reservoirs 142a with the shape shown in FIG. 5A, white triangle symbols show simulation results for optical receptacle 120 having adhesive reservoirs 142b with the shape shown in FIG. 5B, and white lozenge symbols show simulation results for optical receptacle 120 having adhesive reservoirs 142c with the shape shown in FIG. 5C.

These graphs show that movements of first optical surfaces in optical receptacle 120' of Comparative Example without adhesive reservoir 142 by the curing of the adhesive were large in X axis direction and Y axis direction. On the other hand, movements of first optical surfaces 132 in each of optical receptacles 120 having adhesive reservoir 142, 142a, 142b or 142c were reduced. The moving distances in X axis direction and Y axis direction did not change significantly when the shape of an opening of adhesive reservoir is changed between 142, 142a, 142b and 142c.

(Effects)

As described above, the deformation of optical receptacle 120 according to Embodiment 1 can be reduced even when optical receptacle 120 is fixed to substrate 112 using an adhesive because adhesive reservoirs 142 are disposed at respective four corners of optical receptacle 120, and the entire circumference of the inner peripheral surface of each adhesive reservoir 142 is surrounded by supporter 140.

(Modification)

An optical module according to a modification of Embodiment 1 differs from optical module 100 according to Embodiment 1 in the shape of optical receptacle 120. The components same as those of optical module 100 according to Embodiment 1 are given the same symbols as those of optical module 100 and the description thereof is omitted, and components differ from those of optical module 100 are mainly described.

FIGS. 8A to 8E illustrate a configuration of optical receptacle 220 according to the modification of Embodiment 1. FIGS. 8A to 8E are a plan view, a bottom view, a front view, a back view and a right side view of optical receptacle 220 according to the modification of Embodiment 1, respectively.

As shown in FIGS. 8A to 8E, optical receptacle 220 according to the modification of Embodiment 1 includes cover 250 in addition to optical receptacle body 130 and supporters 140. Cover 250 is disposed on optical receptacle body 130 and supporters 140. Cover 250 may be formed of the same light transmissive material as optical receptacle body 130 or supporters 140, or of a different non-light transmissive material. For example, cover 250 can be integrally made of the same light transmissive material as optical receptacle body 130 and supporters 140 by injection molding.

(Effects)

As described above, the deformation of optical receptacle 220 according to the modification of Embodiment 1 can be further reduced even when optical receptacle 220 is fixed to substrate 112 using an adhesive because optical receptacle 220 includes cover 250.

Embodiment 2

An optical module according to Embodiment 2 differs from optical module 100 according to Embodiment 1 in the shape of optical receptacle 320. The components same as those of optical module 100 according to Embodiment 1 are given the same symbols as those of optical module 100 and the description thereof is omitted, and components differ from those of optical module 100 are mainly described. The optical module according to Embodiment 2 differs from optical module 100 according to Embodiment 1 in the shape of supporter 340.

(Configuration of Optical Receptacle)

FIGS. 9A to 9E illustrate a configuration of an optical receptacle according to Embodiment 2 of the present invention. FIGS. 9A to 9E are a plan view, a bottom view, a front view, a back view and a right side view of optical receptacle 320 according to Embodiment 2, respectively.

As shown in FIGS. 9A to 9E, optical receptacle 320 according to Embodiment 2 includes optical receptacle body 130 and supporters 340. Optical receptacle 320 is H-shaped in plan view.

Supporters 340 are disposed at the both ends of optical receptacle body 130, respectively. Supporter 340 has the shape of a substantially rectangular parallelepiped longer than supporter 340 of Embodiment 1. Supporters 340 are connected to the both ends of optical receptacle body 130 at the central portions of supporters 340 in the long axis direction, respectively.

Also in the present embodiment, the opening of a through hole in plan view may be in any shape, and may be, for example, in the shape of a circle, a cross, a H-shape, or a cross and another cross rotated by 45° to superimpose on the former cross.

(Simulation)

The moving distances of first optical surfaces 132 (deformation amount of optical receptacle) were simulated also for optical receptacle 320 according to Embodiment 2 when the optical receptacle is fixed with a thermosetting epoxy resin adhesive (after heating) in the same manner as in Embodiment 1.

Figure 10A:
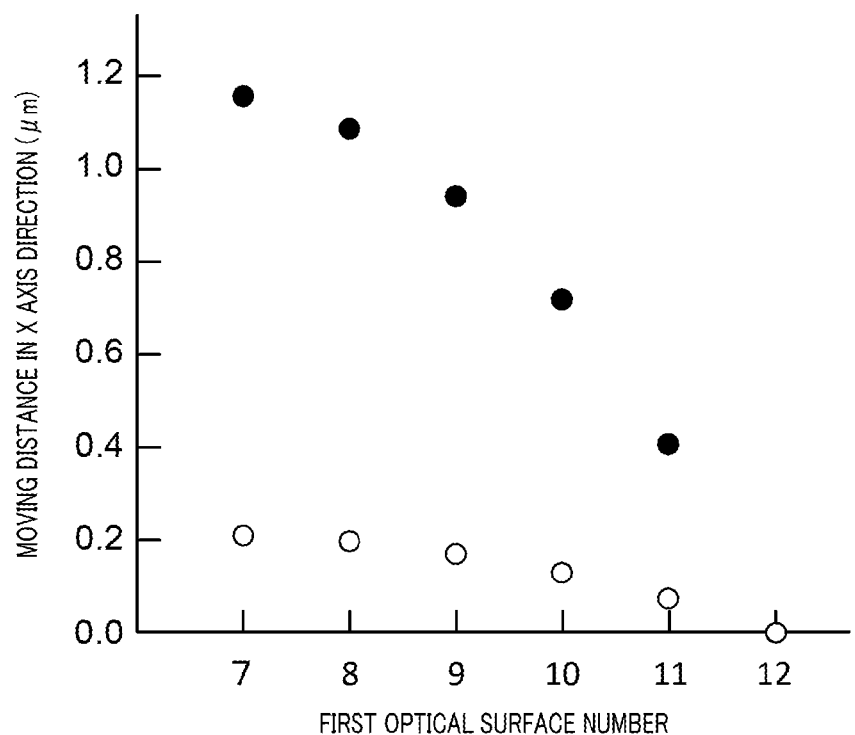
FIGS. 10A and 10B are simulation results for the optical receptacle according to Embodiment 2.
Figure 10B:
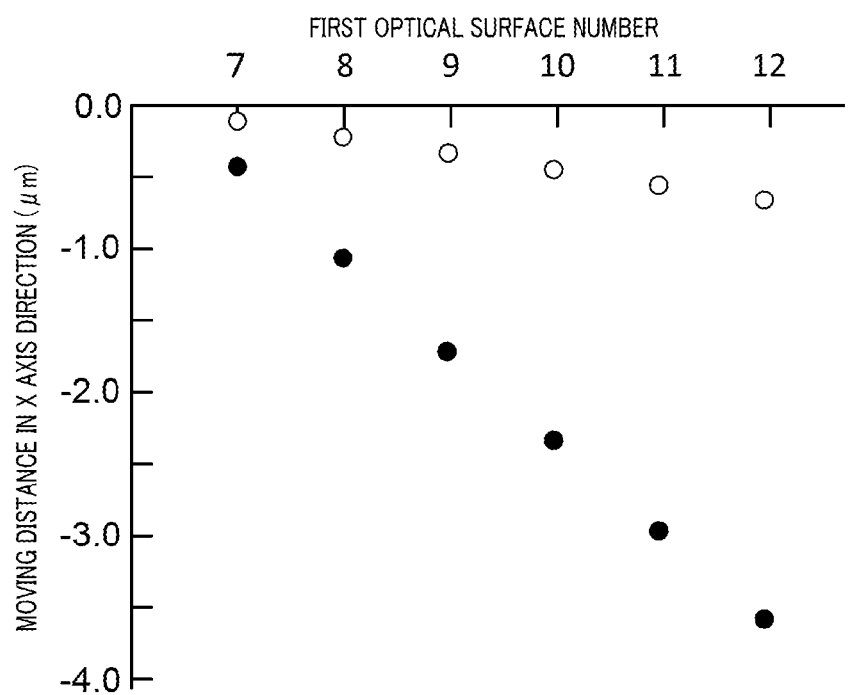
Figure 11A:
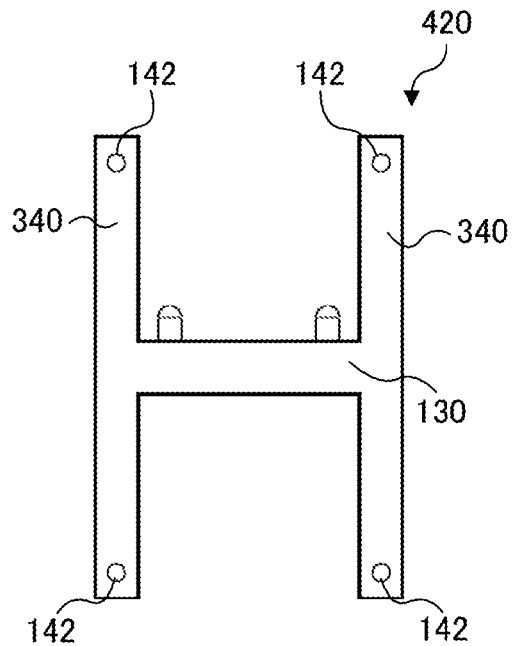
FIGS. 11A to 11E illustrate a configuration of an optical receptacle according to a modification of Embodiment 2.
Figure 11B:
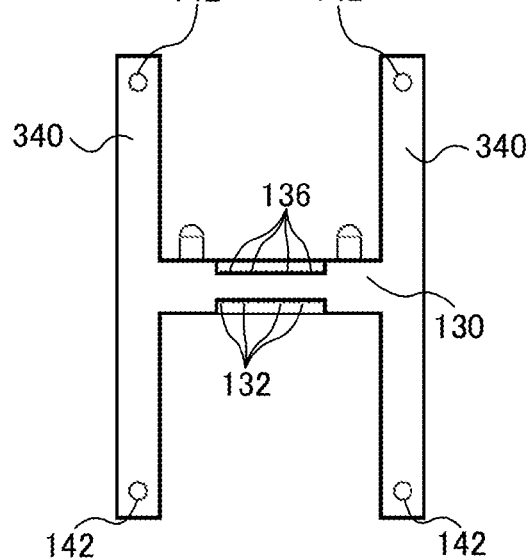
Figure 11C:
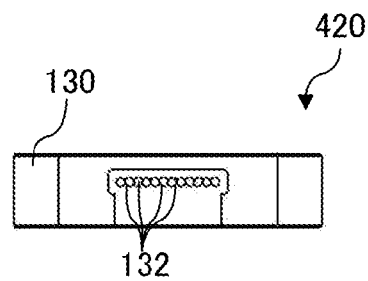
Figure 11D:
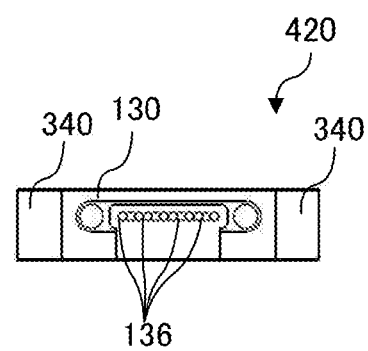
Figure 11E:
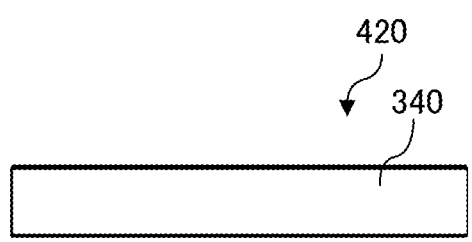

FIGS. 10A and 10B are graphs showing the relationship between first optical surfaces (incidence surfaces) and the respective moving distances of first optical surfaces caused by the curing of the adhesive. FIG. 10A is a graph showing the moving distances of first optical surfaces 132 in X axis direction, and FIG. 10B is a graph showing the moving distances of first optical surfaces 132 in Y axis direction. In the graphs, the abscissa represents the numbers of the first optical surfaces given as described above. The ordinate represents the moving distance of the first optical surface from a position before curing the adhesive to a position after curing the adhesive. Black circle symbols in FIGS. 10A and 10B show simulation results for optical receptacle 120' of Comparative Example in FIGS. 6A to 6E for comparison, and white circle symbols show simulation results for optical receptacle 320 according to Embodiment 2 in FIGS. 9A to 9E.

These graphs show that movements of first optical surfaces in optical receptacle 120' of Comparative Example without adhesive reservoir 142 by the curing of the adhesive were large in X axis direction and Y axis direction. On the other hand, movements of first optical surfaces 132 in H-shaped optical receptacles 320 in plan view were reduced.

(Modification)

An optical module according to a modification of Embodiment 2 differs from optical module 100 according to Embodiment 1 in the positions of light emitting elements and in the shape of optical receptacle 120. The components same as those of the optical modules according to Embodiments 1 and 2 are given the same symbols as those of the optical modules and the description thereof is omitted, and components differs from those of optical module 100 are mainly described.

FIGS. 11A to 11E illustrate a configuration of optical receptacle 420 according to the modification of Embodiment 2. FIGS. 11A to 11E are a plan view, a bottom view, a front view, a back view and a right side view of optical receptacle 420 according to the modification of Embodiment 2, respectively. Optical receptacle 420 according to the modification of Embodiment 2 differs from optical receptacle 320 according to Embodiment 2 in that optical receptacle 420 does not have third optical surface 134.

As shown in FIGS. 11A to 11E, optical receptacle 420 according to the modification of Embodiment 2 includes optical receptacle body 130 and supporters 340. Optical receptacle body 130 includes first optical surfaces 132 and second optical surfaces 136. First optical surfaces 132 are disposed on a first side surface of optical receptacle body 130. Second optical surfaces 136 are disposed on a second side surface of optical receptacle body 130 so as to face respective first optical surfaces 132. In the present embodiment, light emitting elements are disposed so as to emit laser light toward the first side surface of optical receptacle body 130. The laser light emitted from the light emitting element is incident on first optical surface 132 (incidence surface) and emitted from second optical surface 136 (emission surface) to reach optical transmission member 116.

(Effects)

Optical receptacles 320 and 420 according to Embodiment 2 provide the same effects as optical receptacle 120 according to Embodiment 1.

In the description of above embodiments, adhesive reservoir 142 in the optical receptacle is a through hole, but adhesive reservoir 142 may be a bottomed recess. In this case, the inner peripheral surface of the recess is also surrounded by supporter 140 or 340 throughout the entire circumference of the surface. Further, the opening of adhesive reservoir 142 may be in any shape, and may be, for example, in the shape of a circle, a cross, a H-shape, or a cross and another cross rotated by 45° to superimpose on the former cross.

The optical module according to any one of the embodiments may monitor output of laser light (e.g., intensity and amount of the light) emitted from light emitting elements 114. In this case, photoelectric conversion device 110 of the optical module includes substrate 112, light receiving elements disposed on substrate 112 and a control section that controls output of laser light emitted from light emitting element 114 based on the intensity and amount of monitoring light received by the light receiving element, although not illustrated. Optical receptacle 120 further includes a separating section that separates light incident on first optical surface 132 into signal light propagating toward optical transmission member 116 and monitoring light propagating toward the light receiving element.

In the above embodiments, first optical surface 132 and second optical surface 136 in the optical receptacle are convex lenses, but first optical surface 132 and second optical surface 136 may be flat surfaces. Specifically, only first optical surface 132 may be a flat surface, or only second optical surface 136 may be a flat surface. When first optical surface 132 is formed in a flat surface, third optical surface 134 is formed to function as a concave mirror, for example. When light immediately before reaching second optical surface 136 is effectively converged by first optical surface 132, third optical surface 134 or the like, second optical surface 136 may be formed in a flat surface.

Further, the optical receptacle according to any one of the embodiments may be used for an optical module on receiving side. In this case, the receiving optical module includes a plurality of light receiving elements for receiving light instead of the plurality of light emitting elements 114. The light receiving elements are disposed on the same positions as the respective corresponding light emitting elements. The receiving optical module has second optical surfaces 136 as incidence surfaces, and first optical surfaces as emission surfaces. Light emitted from the end surface of optical transmission member 116 enters the optical receptacle from second optical surface 136. The light entered the optical receptacle is reflected by third optical surface 134 to be emitted from first optical surface 132 toward the light receiving element. In the case of optical module not having a reflection surface, light entered the optical receptacle is emitted from first optical surface 132 toward the light receiving element.

In the present embodiments, adhesive reservoirs 142 are formed in supporter 140 or 340, but the same effects can be provided when adhesive reservoirs 142 are formed in substrate 112.

This application claims priority based on Japanese patent Application No. 2013-203666, filed on Sep. 30, 2013, the entire contents of which including the specification and the drawings are incorporated herein by reference.

INDUSTRIAL APPLICABILITY

The optical receptacle and optical module according to the present invention are particularly advantageous for optical communications using optical transmission members.

REFERENCE SIGN LIST

100 Optical Module
110 Photoelectric Conversion Device
112 Substrate
114 Light Emitting Element
116 Optical Transmission Member
120, 120', 220, 320, 420 Optical Receptacle
130 Optical Receptacle Body
132 First Optical Surface (Incidence Surface)
134 Third Optical Surface (Reflection Surface)
136 Second Optical Surface (Emission Surface)
138 Projection
139 Optical Transmission Member Attachment
140, 340 Supporter 142, 142a, 142b, 142c Adhesive Reservoir
250 Cover

The invention claimed is:

1. An optical receptacle which is disposed between a plurality of light emitting elements or a plurality of light receiving elements and a plurality of optical transmission members, and is configured to optically couple the plurality of light emitting elements or the plurality of light receiving elements to end surfaces of the plurality of optical transmission members, respectively, the optical receptacle comprising:

an optical receptacle body including a plurality of first optical surfaces and a plurality of second optical surfaces, each of the plurality of first optical surfaces being configured such that light emitted from a corresponding one of the plurality of light emitting elements is incident on a first optical surface of the plurality of first optical surfaces or being configured to emit light propagating inside the optical receptacle body toward a corresponding one of the plurality of light receiving elements, and each of the plurality of second optical surfaces being configured to emit the light incident on the first optical surface toward an end surface of a corresponding one of the plurality of optical transmission members or being configured such that light from a corresponding one of the plurality of optical transmission members is incident on a second optical surface of the plurality of second optical surfaces;

two supporters which are connected to a respective end of the optical receptacle body, wherein each of the two supporters is connected to one end of the optical receptacle body at an end of the each of the two supporters, and the two supporters face each other with a space therebetween; and four adhesive reservoirs to be filled with only an adhesive, the four adhesive reservoirs being disposed at respective four corners of the optical receptacle in plan view, wherein each of the four adhesive reservoirs is a through hole or a recess, the through hole or the recess is surrounded circumferentially by a supporter of the two supporters, and each of the four adhesive reservoirs has a shape such that horizontal forces derived from adhesive shrinkage, which cause deformation of the optical receptacle body, are offset by each other when an adhesive reservoir of the four adhesive reservoirs is filled with the adhesive, wherein the optical receptacle body and the two supporters together have a plane symmetrical shape with respect to a plane parallel to an optical axis of the light emitted from each of the plurality of second optical surfaces, and the four adhesive reservoirs are disposed plane symmetrically with respect to the plane.

2. The optical receptacle according to claim 1, wherein the optical receptacle body further includes a reflection surface which is configured to reflect the light incident on the plurality of first optical surfaces toward the plurality of second optical surfaces, or to reflect the light incident on the plurality of second optical surfaces toward the plurality of first optical surfaces.

3. The optical receptacle according to claim 2, wherein the plurality of first optical surfaces are disposed on a bottom surface side of the optical receptacle body, and the plurality of second optical surfaces are disposed on a side surface side of the optical receptacle body.

4. The optical receptacle according to claim 1, wherein the plurality of first optical surfaces are disposed on a first side surface side of the optical receptacle body, and the plurality of second optical surfaces are disposed on a second side surface side of the optical receptacle body to face the first optical surfaces.

5. The optical receptacle according to claim 1 further comprising:

a cover disposed on the optical receptacle body and the two supporters.

6. An optical module comprising:

the optical receptacle according to claim 1; and a substrate on which the plurality of light emitting elements or the plurality of light receiving elements are disposed, wherein the optical receptacle is fixed to a surface of the substrate with an adhesive injected into the four adhesive reservoirs, wherein the four adhesive reservoirs are filled with only the adhesive, and wherein horizontal forces derived from shrinkage of the adhesive and causing deformation of the optical receptacle body are offset by each other.

* * * * *